United States Patent
Liu et al.

(10) Patent No.: US 10,135,569 B2
(45) Date of Patent: Nov. 20, 2018

(54) METHOD AND USER EQUIPMENT FOR RECEIVING SIB1

(71) Applicant: Telefonaktiebolaget LM Ericsson (publ), Stockholm (SE)

(72) Inventors: Peng Liu, Beijing (CN); Yushi Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/541,225

(22) PCT Filed: Feb. 4, 2015

(86) PCT No.: PCT/CN2015/072227
§ 371 (c)(1),
(2) Date: Jun. 30, 2017

(87) PCT Pub. No.: WO2016/123762
PCT Pub. Date: Aug. 11, 2016

(65) Prior Publication Data
US 2017/0373795 A1 Dec. 28, 2017

(51) Int. Cl.
*H04W 48/16* (2009.01)
*H04L 1/00* (2006.01)

(52) U.S. Cl.
CPC .......... *H04L 1/0057* (2013.01); *H04W 48/16* (2013.01)

(58) Field of Classification Search
CPC ... H04W 48/16; H04W 72/082; H04W 68/02; H04W 16/16; H04W 84/045; H04L 1/0057; H04L 5/0053; H04L 5/0073
See application file for complete search history.

(56) References Cited

U.S. PATENT DOCUMENTS

2011/0235601 A1* 9/2011 Yoo .............. H04L 5/0053
370/329
2012/0033646 A1 2/2012 Luo et al.
(Continued)

FOREIGN PATENT DOCUMENTS

CN 102104965 A 6/2011
CN 102204333 A 9/2011
(Continued)

OTHER PUBLICATIONS

PCT Notification of Transmittal of the International Search Report and the Written Opinion of the Internaitonal Searching Authority, or the Declaration for International appalication No. PCT/CN2015/072227—dated Nov. 11, 2015.
(Continued)

*Primary Examiner* — Thanh Le
(74) *Attorney, Agent, or Firm* — Baker Botts, LLP

(57) ABSTRACT

The present disclosure relates to a method used in a User Equipment (UE) for receiving System Information Block Type 1 (SIB1) of a serving cell of the UE and the associated UE. The method includes: receiving a signal carrying the SIB1 of the serving cell; determining one or more neighboring cells of the serving cell as potential interference neighboring cells; determining one or more SIB1 Resource Elements (REs) carrying the SIB1 of the serving cell and one or more SIB1 REs carrying SIB1 of each of the potential interference neighboring cells; determining one or more of the potential interference neighboring cells having one or more SIB1 REs colliding with said one or more SIB1 REs of the serving cell, as valid interference neighboring cells; cancelling SIB1 of each of the valid interference neighboring cells from the received signal; and decoding the received signal after the cancellation to obtain the SIB1 of the serving cell.

9 Claims, 7 Drawing Sheets

(56) References Cited

U.S. PATENT DOCUMENTS

| | | | |
|---|---|---|---|
| 2012/0115485 A1* | 5/2012 | Narasimha | H04W 68/02 |
| | | | 455/437 |
| 2014/0126494 A1 | 5/2014 | Charbit | |
| 2014/0204866 A1 | 7/2014 | Siomina et al. | |
| 2014/0206341 A1 | 7/2014 | Siomina et al. | |
| 2014/0233518 A1 | 8/2014 | Lee et al. | |
| 2015/0288505 A1* | 10/2015 | Park | H04L 5/0073 |
| | | | 370/336 |

FOREIGN PATENT DOCUMENTS

| | | |
|---|---|---|
| CN | 102812661 A | 12/2012 |
| CN | 102845116 A | 12/2012 |
| CN | 103380648 A | 10/2013 |
| EP | 2 597 921 A2 | 5/2013 |
| EP | 2 597 921 A3 | 12/2017 |
| WO | 2014 047786 A1 | 4/2014 |

OTHER PUBLICATIONS

Extended European Search Report for Application No./Patent No. 15880718.0—1220/3254398 PCT/CN2015072227—dated Sep. 11, 2018.

* cited by examiner

US 10,135,569 B2

METHOD AND USER EQUIPMENT FOR RECEIVING SIB1

PRIORITY

This nonprovisional application is a U.S. National Stage Filing under 35 U.S.C. § 371 of International Patent Application Serial No. PCT/CN2015/072227 filed Feb. 4, 2015, and entitled "Method And User Equipment For Receiving SIB1."

TECHNICAL FIELD

The present disclosure generally relates to the technical field of wireless communications, and particularly, to a method implemented in a User Equipment (UE) for receiving System Information Block Type 1 (SIB1) from a serving cell of the UE, as well as to the UE.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In a Long Term Evolution (LTE) system, System Information (SI) is important as it can provide necessary information to a UE for linking with network. SI is separated into several blocks, including Master Information Block (MIB) and SIBs. Not like MIB being broadcasted in Physical Broadcast CHannel (PBCH), SIBs are all broadcasted in Physical Downlink Shared CHannel (PDSCH). Among these SIBs, SIB1 includes scheduling information of the other SIBs, so SIB1 reception is very important for the UE.

To be specific, SIB1 includes information as follows:
  Information about whether a terminal is allowed to camp on the serving cell;
  Information about Time Division Duplexing (TDD) configurations;
  Scheduling information of the remaining SIBs; and
  Value tag to indicate a change has occurred in a SI message.

As specified in the 3rd Generation Partnership Project (3GPP) specification, SIB1 is typically broadcasted in subframe 5 of the even numbered radio frames. SIB1 needs to be decoded, e.g.,
  when UE finishes cell selection or cell reselection;
  when UE finishes cell handover;
  when UE returns from out of coverage area;
  when SI is changed;
  upon receipt of Received Earthquake and Tsunami Warning System (ETWS) or Commercial Mobile Alert System (CMAS) indicators; or
  if there is no validated update for 3 hours.

With the communication development, the network deployment is more complex and the intra-frequency interference issue becomes more outstanding. In the intra-frequency interference condition, there are some issues for SIB1 reception in the above scenarios. For a typical serving and neighboring cells deployment, in case of system frame number (SFN) alignment between the two cells, there may be collision of the SIB1 transmission of serving and neighboring cells. When the neighboring cell is strong, UE may not receive SIB1 of serving cell correctly due to interference from SIB1 of neighboring cell, and then the linking procedure between UE and network would be blocked.

FIG. 1 illustrates some examples for describing a SIB1 reception issue in an intra-frequency interference condition. As shown in FIG. 1, Evolved Node B 1 (eNB1) and eNB2 are two neighboring cells and they have an overlay area at cell edge zone. In the overlay area, signals of the two cells are both strong. UE1, UE2 and UE3 are three different users under different conditions.

In a first example, UE1 is to move from eNB1 into eNB2. Because eNB1 is still strong in the cell edge of eNB2, it is not easy to decode SIB1 of eNB2.

In a second example, UE2 is located in the cell edge of eNB2. When UE2 decodes SIB1 of eNB2, it cannot decode SIB1 of eNB2 accurately because of the strong interference from eNB1.

In the third example, UE3 is to move from out of coverage area into the overlay area. In this example, UE3 needs to detect SIB1 of eNB1 or eNB2 depending on cell search and measurement results. Because the two eNBs are both strong, UE3 cannot decode SIB1 of one cell accurately due to the strong interference from the other eNB.

To improve SIB1 reception performance in the intra-frequency interference condition, some traditional solutions have been tried, e.g., use of Cell-specific Reference Signal (CRS) interference cancellation (IC) or Interference Rejection Combining (IRC).

However, CRS IC cannot work well because the SIB1 interference comes from not only the CRS of neighboring cells, but also the SIB1 Resource Elements (REs) of neighboring cells. When the neighboring cells may be much stronger than the serving cell, IRC cannot solve the issue because IRC cannot provide enough performance improvement.

Consequently, neither of the above solutions can solve the SIB1 reception issue. So, there is a need for a solution to enhance SIB1 reception in the intra-frequency interference condition.

SUMMARY

It is in view of the above considerations and others that the various embodiments of the present technology have been made. To be specific, aiming to at least some of the above defects, the present disclosure proposes to determine one or more valid interference neighboring cells in terms of REs and then cancel SIB1 of the valid interference neighboring cells (i.e., SIB1 interference from the neighboring cells) without considering SIB1 of other neighboring cells, thereby improving SIB1 reception performance at UE.

According to a first aspect of the present disclosure, there is provided a method used in a UE for receiving SIB1 of a serving cell of the UE. The method includes: receiving a signal carrying the SIB1 of the serving cell; determining one or more neighboring cells of the serving cell as potential interference neighboring cells; determining one or more SIB1 REs carrying the SIB1 of the serving cell and one or more SIB1 REs carrying SIB1 of each of the potential interference neighboring cells; determining one or more of the potential interference neighboring cells having one or more SIB1 REs colliding with said one or more SIB1 REs of the serving cell, as valid interference neighboring cells; cancelling SIB1 of each of the valid interference neighboring cells from the received signal; and decoding the received signal after the cancellation to obtain the SIB1 of the serving cell.

Preferably, determining one or more neighboring cells of the serving cell as potential interference neighboring cells includes: calculating a quality indicator for each neighboring cell of the one or more neighboring cells of the serving cell; and determining the neighboring cell as a potential interference neighboring cell if the quality indicator is larger than a predetermined threshold.

Preferably, the quality indicator is a signal to interference and noise power ratio.

Preferably, determining one or more SIB1 REs carrying the SIB1 of the serving cell and one or more SIB1 REs carrying SIB1 of each of the potential interference neighboring cells includes: decoding Physical Downlink Control Channel (PDCCH) of the serving cell to determine the one or more SIB1 REs of the serving cell; and decoding PDCCH of each of the potential interference neighboring cells to determine one or more SIB1 REs of each of the potential interference neighboring cells.

According to a second aspect of the present disclosure, there is provided a UE for receiving SIB1 of a serving cell of the UE. The UE includes: a receiving unit configured to receive a signal carrying the SIB1 of the serving cell has been broadcasted; a potential interference neighboring cell determining unit configured to determine one or more neighboring cells of the serving cell, as potential interference neighboring cells; a RE determining unit configured to determine one or more SIB1 REs carrying the SIB1 of the serving cell and one or more SIB1 REs carrying SIB1 of each of the potential interference neighboring cells; a valid interference neighboring cell determining unit configured to determine one or more of the potential interference neighboring cells having one or more SIB1 REs colliding with said one or more SIB1 REs of the serving cell, as valid interference neighboring cells; an cancelling unit configured to cancel SIB1 of each of the valid interference neighboring cells from the received signal; and a decoding unit configured to decode the received signal after the cancellation to obtain the SIB1 of the serving cell.

According to a third aspect of the present disclosure, there is provided a computer-readable storage medium storing instructions that when executed, causing one or more computing devices to perform the method according to the first aspect.

According to the present disclosure, the UE can determine one or more valid interference neighboring cells in terms of REs, so that the UE does not need to cancel SIB1 of all neighboring cells when receiving SIB1 of the UE's serving cell, but only cancels SIB1 interference in interfered REs. Thereby, this can improve accuracy of SIB1 reception.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

The present disclosure proposes SIB1-Interference Cancellation (SIB1-IC) per RE, i.e., cancelling SIB1 interference from neighboring cells one RE by one RE to obtain SIB1 of a serving cell. On basis of such proposed SIB1-IC, the present disclosure further proposes a real-time decision based SIB1 reception solution. In such a solution, the UE receives a signal carrying SIB1 of its serving cell, and stores the signal in the UE's local memory. Then, a RE based real-time decision procedure is employed to decide whether there is a valid interference neighboring cell, and thereby deciding whether to enable the SIB1-IC or not. When SIB1-IC is enabled, SIB1 of the neighboring cell is cancelled. Finally, the SIB1 of the serving cell carried on PDSCH is decoded.

Figure 1:
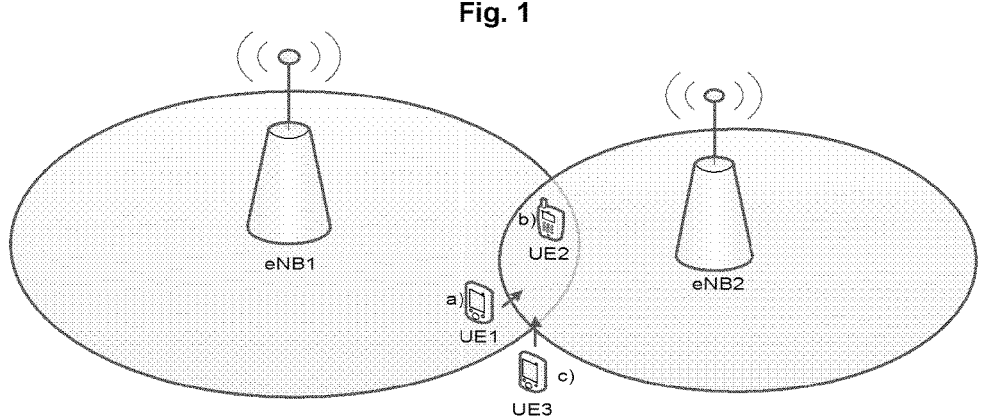
FIG. 1 illustrates some examples for describing a SIB1 reception issue in an intra-frequency interference condition.
Figure 2:
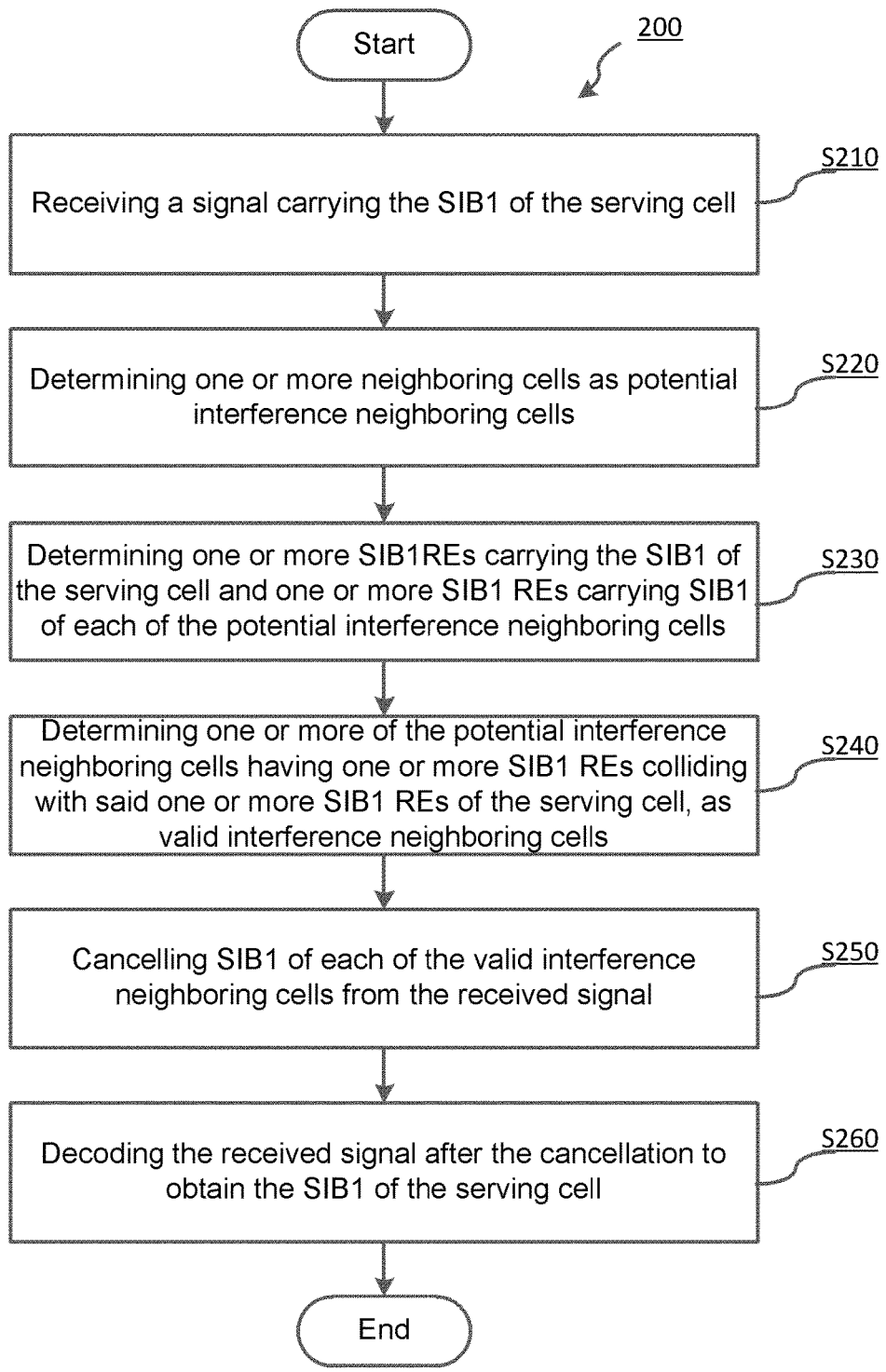
FIG. 2 illustrates a flowchart of a method 200 used in a UE for receiving SIB1 of the UE's serving cell according to embodiments of the present disclosure.

FIG. 2 illustrates a flowchart of a method 200 used in a UE for receiving SIB1 of the UE's serving cell according to embodiments of the present disclosure. For example, the method 200 may be applied in the intra-frequency interference scenario as shown in FIG. 1.

At step S210, the UE receives a signal carrying the SIB1 of the serving cell. For example, the UE may receive such a signal in subframe 5 of the even numbered radio frames.

At step S220, the UE determines one or more neighboring cells of the serving cell as potential interference neighboring cells.

As an implementation of the step S220, the UE calculates a quality indicator for each neighboring cell of the one or more neighboring cells of the serving cell, and then determines the neighboring cell as a potential interference neighboring cell if the quality indicator is larger than a predetermined threshold.

The quality indicator reflects a ratio of signal strength received from each neighboring cell to the total signal strength. For example, the quality indicator is expressed as a signal to interference and noise power ratio (SINR) in dB, e.g., $$Q_j = 10 \times \log 10(RSRP_j / \sigma^2_j) \quad (1)$$

where $RSRP_j$ represent reference signal received power of the j-th neighbor cell, and $\sigma^2_j$ represents noise power on CRS REs of the j-th neighbor cell.

There are various methods to calculate noise power on CRS REs. As an example, the UE calculates raw power of CRS REs firstly and then obtains $\sigma^2_j$ by subtracting $\overline{S}_{crs}$ from the raw power of CRS REs. As another example, the UE constructs channel impulse response in time domain by raw channel estimates on CRS, picks up noise tap and then calculates $\sigma^2_j$.

If the quality indicator is not larger than the predetermined threshold, it may be determined that there is no potential interference neighboring cell. In this case, the UE will perform the normal SIB1 decoding on the serving cell.

At step S230, the UE determines one or more SIB1 REs carrying the SIB1 of the serving cell and one or more SIB1 REs carrying SIB1 of each of the potential interference neighboring cells.

As an implementation of the step S230, the UE decodes PDCCH of the serving cell to determine the one or more SIB1 REs of the serving cell, and decodes PDCCH of each of the potential interference neighboring cells to determine one or more SIB1 REs of each of the potential interference neighboring cells.

At step S240, the UE determines one or more of the potential interference neighboring cells having one or more SIB1 REs colliding with said one or more SIB1 REs of the serving cell, as valid interference neighboring cells. As a result, a RE cancellation pattern may be generated. For example, the RE cancellation pattern may be a bitmap indicating colliding SIB1 REs with value 1 and else with 0.

Figure 3:
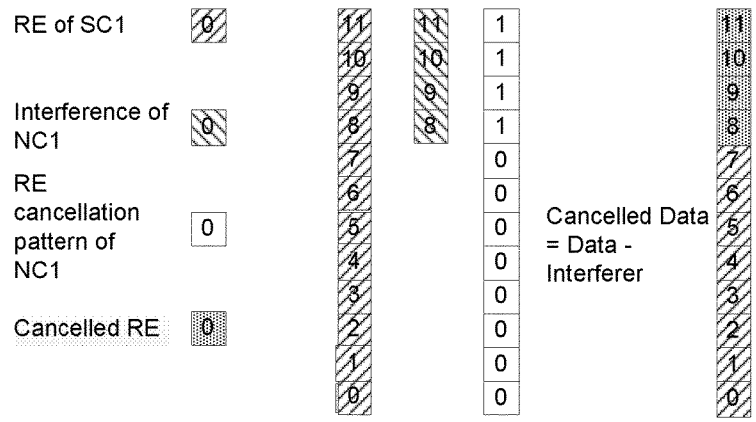
FIG. 3 illustrates an exemplary RE cancellation pattern according to embodiments of the present disclosure.

FIG. 3 illustrates an exemplary RE cancellation pattern according to embodiments of the present disclosure. In this example, the RE cancellation pattern is generated under a typical scenario, in which there is one serving cell (SC1) and one valid neighbor cell (NC1), and 12 sub-carriers in one OFDM symbol are assumed here for illustration. It should be appreciated that the present disclosure is not limited thereto, but the present disclosure should be applicable to any other appropriate scenarios.

As shown in FIG. 3, there are four REs carrying SIB1 of SC1 colliding with four REs carrying SIB1 of SC1. In this case, NC1 is determined as a valid interference neighboring cell, and thus the SIB1 of NC1 is to be cancelled from the signal received at step S210.

If no valid interference neighboring cell is determined at step S240, that is, no potential interference neighboring cell has even one SIB1 RE colliding with those of the serving cell, the method 200 may proceed with the conventional SIB1 decoding procedure.

At step S250, the UE cancels SIB1 of each of the valid interference neighboring cells from the received signal. For example, the UE may cancel SIB1 of each valid interference neighboring cell from the received signal separately. Alternatively, the UE may generate SIB1 of each valid interference neighboring cell in serial, then combine them into one interference vector according to respective RE cancellation patterns, and finally cancel the combined interference vector from the received signal.

There are various manners applicable in a UE obtaining SIB1 of its one neighboring cell. As an example, the UE may generate the SIB1 of the neighboring cell based on decoded SIB1 bits of the neighboring cell.

Figure 4:
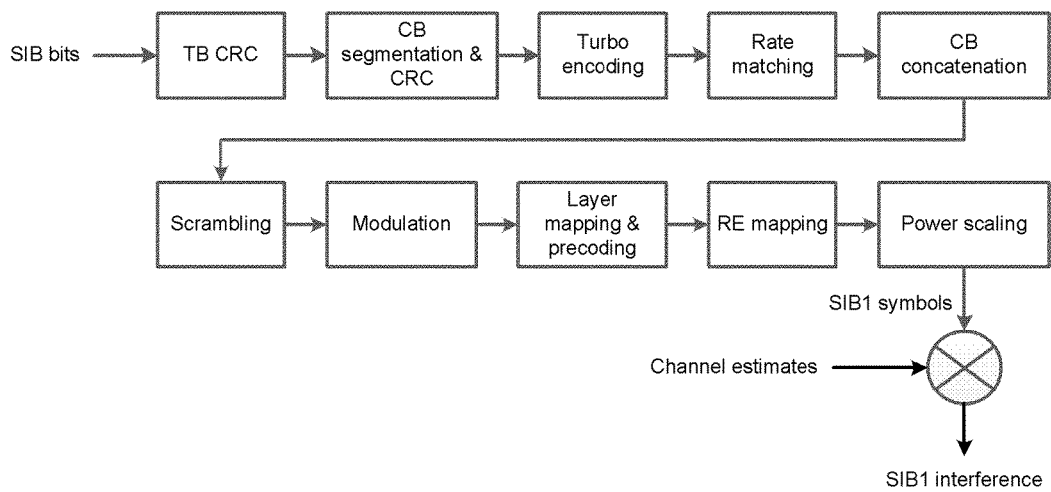
FIG. 4 illustrates an exemplary procedure for generating SIB1 interference of a neighboring cell at a UE.

FIG. 4 illustrates an exemplary procedure for generating SIB1 of a neighboring cell (i.e., SIB1 interference from the neighboring cell) at a UE. It should be noted that the SIB1 interference here refers to a signal received at one or more antennas of the UE from the neighboring cell, i.e., a signal received from the neighboring cell without any processing at the UE.

As shown in FIG. 4, the UE inputs SIB1 bits of the neighboring cell, which may be decoded from PDSCH of the neighboring cell, into processing blocks, such as Transport Block (TB) Cyclic Redundancy Check (CRC), Code Block (CB) segmentation & CRC, Turbo encoding, rate matching, CB concatenation, scrambling, modulation, layer mapping & precoding, RE mapping, and power scaling, etc., as specified in LTE-related standards, to obtain the SIB1 symbol of the neighboring cell. Then, channel estimates are applied on the SIB1 symbol to finally obtain SIB1 interference of the neighboring cell. It should be appreciated that any other appropriate procedures as specified in other wireless communication standards would be applicable in the present disclosure.

In the following, the method 200 will be further explained by assuming the scenario of FIG. 3 as an example.

After PDCCHs of SC1 and NC1 are decoded, one or more SIB1 REs of SC1 (i.e., RE allocations of SCI's SIB1) in PDSCH may be determined at step S230, here denoted as PosS and PosN respectively. Then, SCI's RE cancellation pattern may be illustrated as blank blocks in FIG. 3 and may be expressed as:

$$RECP = \begin{cases} 1 & PosS = PosN \\ 0 & PosS \neq PosN \end{cases} \quad (2)$$

After SIB1 symbols of NC1 are generated, SIB1 interference of NC1 to SC1 may be generated as:

$$R_n(k,l) = RECP \cdot \sum_{p=1}^{N_{tx}} \hat{H}_{n,p}(k,l) D_p(k,l) \ (k,l) \in \{PosS=PosN\} \quad (3)$$

where $D_p(k,l)$ are the generated SIB1 complex symbols of the p-th transmission antenna, $\hat{H}_{n,p}(k,l)$ are the effective channel estimation results for p-th transmission antenna and n-th reception antenna, $N_{tx}$ is the total transmission antenna number, and $R_n(k,l)$ is the obtained SIB1 interference for the n-th reception antenna. The SIB1 interference generation processing is executed on the RECP positions.

Finally, the SIB1 interference of NC1 is cancelled to obtain the SIB1 of SC1 as:

$$RE_{n,cancelled}(k,l) = RE_n(k,l) - R_n(k,l) \ (k,l) \in \{PosS=PosN\} \quad (4)$$

where $RE_n(k,l)$ is the signal received at step S210, and $RE_{n,cancelled}(k,l)$ is the SIB1 of SC1.

For the more valid neighbor cells, the SIB1 interferences of each neighbor cells will be cancelled from the REs of serving cell in serial according to corresponding RE cancellation pattern.

At step S260, the UE decodes the received signal after the cancellation to obtain the SIB1 of the serving cell.

One major advantage with the method 200 is that the UE can determine one or more valid interference neighboring cells in terms of REs, so that the UE does not need to cancel SIB1 of all neighboring cells, but only cancels SIB1 interference in interfered REs. Thereby, this can improve accuracy of SIB1 reception.

Figure 5:
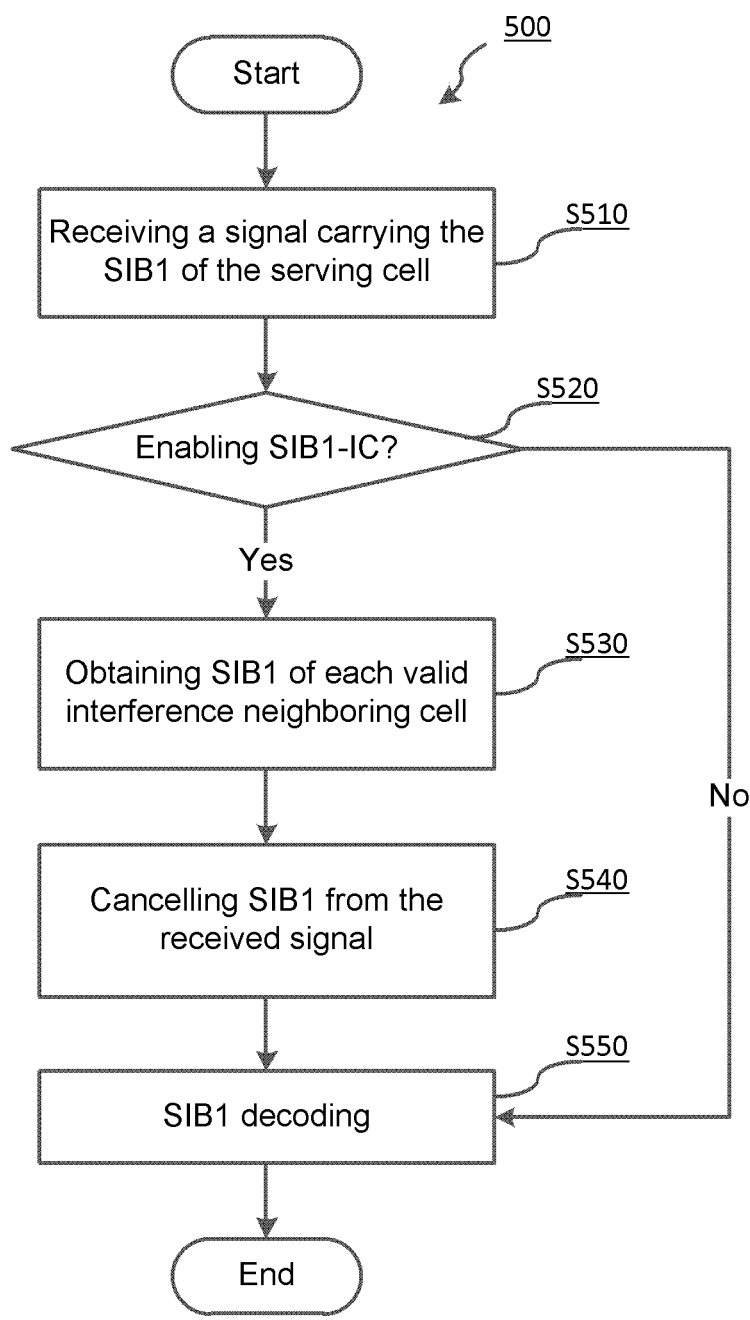
FIG. 5 shows a flowchart of a method 500 used in a UE for receiving SIB1 of the UE's serving cell according to embodiments of the present disclosure.

FIG. 5 shows a flowchart of a method 500 used in a UE for receiving SIB1 of the UE's serving cell according to embodiments of the present disclosure. The method 500 is a specific variant of the method 200.

At step S510, the UE receives a signal carrying the SIB1 of the serving cell, like step S210. For example, the UE may receive such a signal in subframe 5 of the even numbered radio frames. Then, the UE may store the received signal in, e.g., a local memory of the UE.

At step S520, the UE performs a decision on whether to enable SIB1-IC. This step generally involves steps S220, S230, and S240 in FIG. 2. Furthermore, step S520 further includes deciding whether to enable SIB-IC based on results of steps S220, S230, and S240. To be specific, if there are one or more valid interference neighboring cells determined at step S240, the UE may decide to perform SIB1-IC. Then, the method 500 proceeds to step S530. Otherwise, if there is no valid interference neighboring cell determined at step S240, SIB1-IC is not to be enabled and the method 500 goes to step S550 to directly decode the received signal to obtain SIB1 of the serving cell.

At step S530, the UE obtains SIB1 of each valid interference neighboring cell. As mentioned above, the SIB1 of each valid interference neighboring cell here refers to SIB1 interference from each interference neighboring cell, and may be obtained in various manners as known to those skilled in the art.

At step S540, the UE cancels the SIB1 of each valid interference neighboring cell from the received signal. For example, the UE may cancel SIB1 interference of each valid interference neighboring cell from the received signal separately. Alternatively, the UE may obtain SIB1 interference of each valid interference neighboring cell in serial, then combine them into one interference vector according to respective RE cancellation patterns, and finally cancel the combined interference vector from the received signal.

At step S550, the UE decodes the received signal after the cancellation to obtain the SIB1 of the serving cell.

Figure 6:
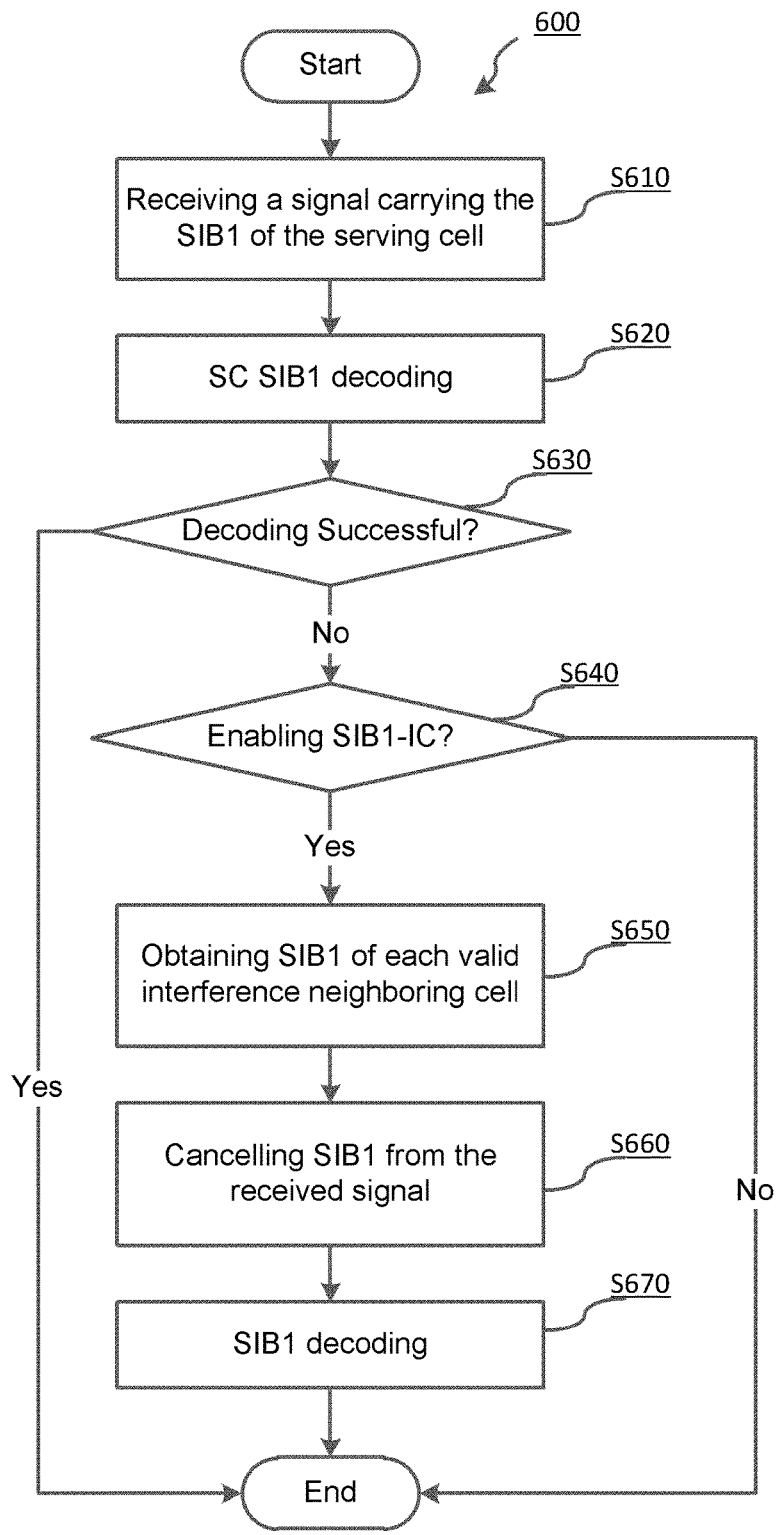
FIG. 6 shows a flowchart of a method 600 used in a UE for receiving SIB1 of the UE's serving cell according to embodiments of the present disclosure.

FIG. 6 shows a flowchart of a method 600 used in a UE for receiving SIB1 of the UE's serving cell according to embodiments of the present disclosure. The method 600 is another specific variant of the method 200 and also a variant of the method 500. It should be noted that suitable parts of the methods 500 and 600 may be combined to provide other variations in addition to the embodiments presented herein.

At step S610, the UE receives a signal carrying the SIB1 of the serving cell, like step S210. For example, the UE may receive such a signal in subframe 5 of the even numbered radio frames. Then, the UE may store the received signal in, e.g., a local memory of the UE.

At step S620, the UE decodes the received signal according to the normal demodulation and decoding processing. To be specific, the UE assumes that the received signal is the SIB1 of the serving cell and then performs the decoding.

At step S630, the UE checks whether the serving cell SIB1 decoding is successful or not. If it is successful, the method 600 goes to end. If it is not successful, then the method 600 proceeds to step S640.

At step S640, the UE performs a decision on whether to enable SIB1-IC. This step generally involves steps S220, S230, and S240 in FIG. 2. Furthermore, step S640 further includes deciding whether to enable SIB-IC based on results of steps S220, S230, and S240. To be specific, if there are one or more valid interference neighboring cells determined at step S240, the UE may decide to perform SIB1-IC. Then, the method 600 proceeds to step S650. Otherwise, if there is no valid interference neighboring cell determined at step S240, SIB1-IC is not to be enabled and the method 600 goes to end.

At step S650, the UE obtains SIB1 of each valid interference neighboring cell. As mentioned above, the SIB1 of each valid interference neighboring cell here refers to SIB1 interference from each interference neighboring cell, and may be obtained in various manners as known to those skilled in the art.

At step S660, the UE cancels the SIB1 of each valid interference neighboring cell from the received signal. For example, the UE may cancel SIB1 interference of each valid interference neighboring cell from the received signal separately. Alternatively, the UE may obtain SIB1 interference of each valid interference neighboring cell in serial, then combine them into one interference vector according to respective RE cancellation patterns, and finally cancel the combined interference vector from the received signal.

At step S670, the UE decodes the received signal after the cancellation to obtain the SIB1 of the serving cell.

Figure 7:
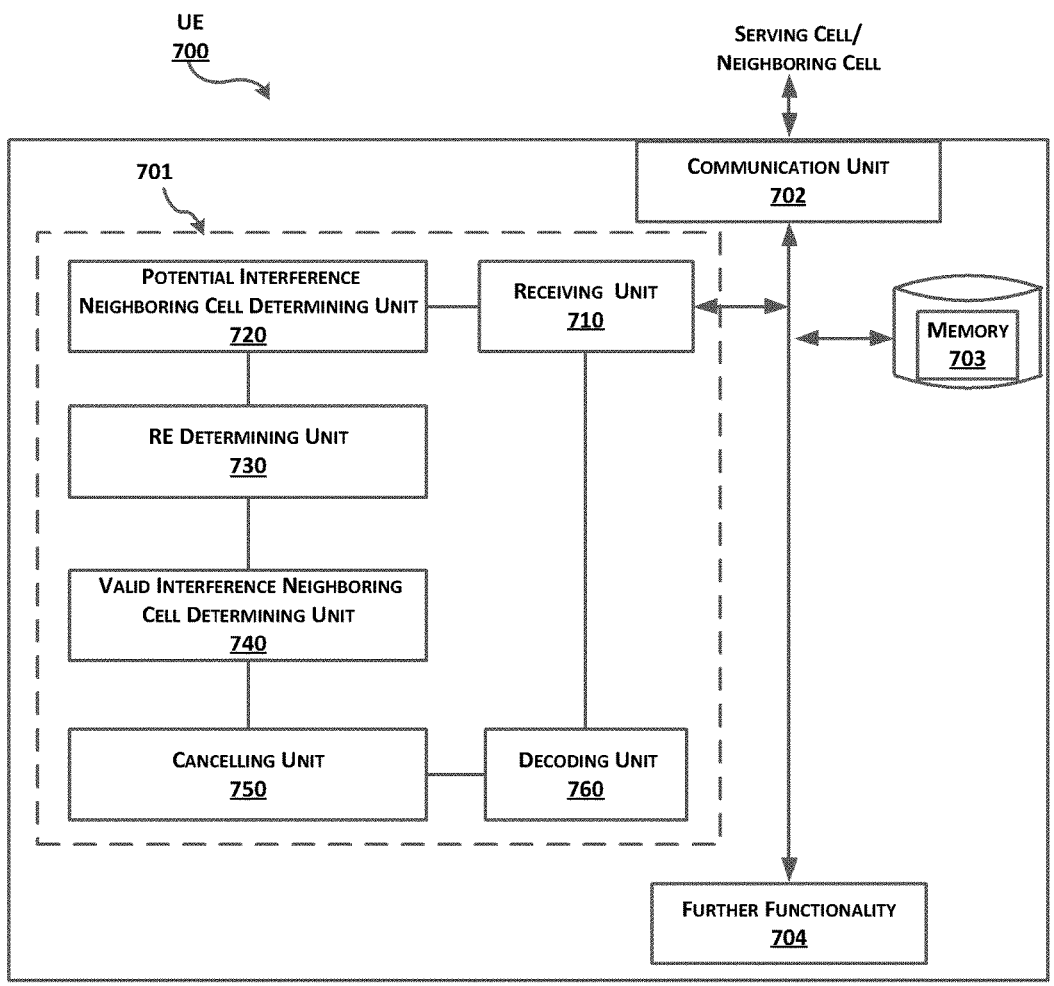
FIG. 7 is a schematic block diagram of a UE 700 according to the present disclosure.

FIG. 7 is a schematic block diagram of a UE 700 according to the present disclosure. UE 700 is configured to receive SIB1 of its serving cell.

The part of UE 700 which is most affected by the adaptation to the herein described method, e.g., the method 200, 500 or 600, is illustrated as an arrangement 701, surrounded by a dashed line. The UE 700 could be, e.g., a mobile terminal, depending on in which type of communication system it is operable, e.g., TDD or synchronized Frequency Division Duplexing (FDD)-type systems such as LTE system. The UE 700 and arrangement 701 are may be further configured to communicate with other entities via a communication unit 702 which may be regarded as part of the arrangement 701. The communication unit 702 comprises means for wireless communication. The arrangement 701 or UE 700 may further comprise other functional units 704, such as functional units providing regular UE functions, and may further comprise one or more storage units 703.

The arrangement 701 could be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 2, FIG. 5 or FIG. 6. The arrangement part of the UE 700 may be implemented and/or described as follows.

Referring to FIG. 7, UE 700 may include a receiving unit 710, a potential interference neighboring cell determining unit 720, a RE determining unit 730, a valid interference neighboring cell determining unit 740, an cancelling unit 750, and a decoding unit 760.

The receiving unit 710 is configured to receive a signal carrying the SIB1 of the serving cell has been broadcasted.

The potential interference neighboring cell determining unit 720 is configured to determine one or more neighboring cells of the serving cell, as potential interference neighboring cells.

As an implementation, the potential interference neighboring cell determining unit 720 is configured to: calculate a quality indicator for each neighboring cell of the one or more neighboring cells of the serving cell; and determine the neighboring cell as a potential interference neighboring cell if the quality indicator is larger than a predetermined threshold. For example, the quality indicator is a signal to interference and noise power ratio.

The RE determining unit 730 is configured to determine one or more SIB1 REs carrying the SIB1 of the serving cell and one or more SIB1 REs carrying SIB1 of each of the potential interference neighboring cells.

In an implementation, the RE determining unit 730 is configured to: decode PDCCH of the serving cell to determine the one or more SIB1 REs of the serving cell; and decode PDCCH of each of the potential interference neighboring cells to determine one or more SIB1 REs of each of the potential interference neighboring cells.

The valid interference neighboring cell determining unit 740 is configured to determine one or more of the potential interference neighboring cells having one or more SIB1 REs colliding with said one or more SIB1 REs of the serving cell, as valid interference neighboring cells. For example, the valid interference neighboring cell determining unit 740 may determine the valid interference neighboring cells based on the RE cancellation pattern as shown in FIG. 3.

The cancelling unit 750 is configured to cancel SIB1 of each of the valid interference neighboring cells from the received signal. The cancelling unit 750 may obtain the SIB1 of each valid interference neighboring cell in various conventional manners.

The decoding unit 760 is configured to decode the received signal after the cancellation to obtain the SIB1 of the serving cell.

It should be noted that two or more different units in this disclosure may be logically or physically combined. For example, the potential interference neighboring cell determining unit 720, the RE determining unit 730, and the valid interference neighboring cell determining unit 740 may be combined as one single unit.

Figure 8:
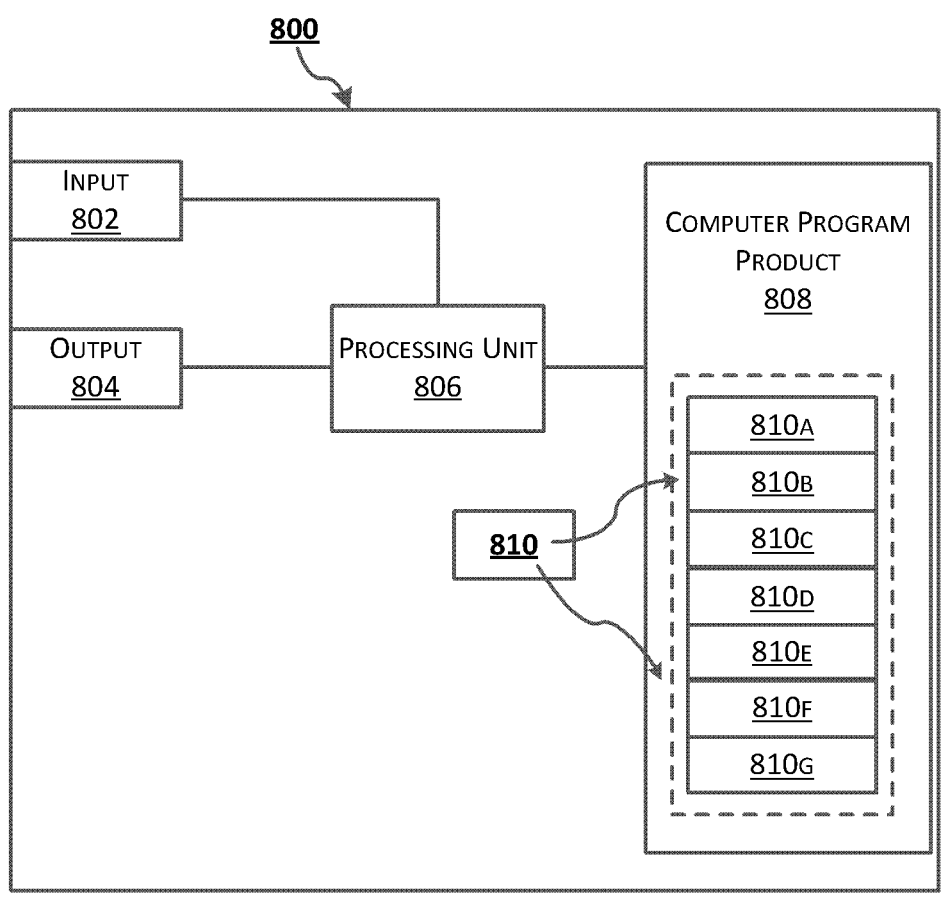
FIG. 8 schematically shows an embodiment of an arrangement 800 which may be used in the UE 700.

FIG. 8 schematically shows an embodiment of an arrangement 800 which may be used in the UE 700. Comprised in the arrangement 800 are here a processing unit 806, e.g., with a Digital Signal Processor (DSP). The processing unit 806 may be a single unit or a plurality of units to perform different actions of procedures described herein. The arrangement 800 may also comprise an input unit 802 for receiving signals from other entities, and an output unit 804 for providing signal(s) to other entities. The input unit and the output unit may be arranged as an integrated entity or as illustrated in the example of FIG. 7.

Furthermore, the arrangement 800 may comprise at least one computer program product 808 in the form of a non-volatile or volatile memory, e.g., an Electrically Erasable Programmable Read-Only Memory (EEPROM), a flash memory and a hard drive. The computer program product 808 comprises a computer program 810, which comprises code/computer readable instructions, which when executed by the processing unit 806 in the arrangement 800 causes the arrangement 800 and/or the UE in which it is comprised to perform the actions, e.g., of the procedure described earlier in conjunction with FIG. 2, FIG. 5 or FIG. 6.

The computer program 810 may be configured as a computer program code structured in computer program modules 810A-810G.

Hence, in an exemplifying embodiment when the arrangement 800 is used in the UE 700, the code in the computer program of the arrangement 800 includes a receiving module 810A for receiving a signal carrying the SIB1 of the serving cell has been broadcasted. The code in the computer program 810 further includes a potential interference neighboring cell determining module 810B for determining one or more neighboring cells of the serving cell, as potential interference neighboring cells. The code in the computer program 810 further includes a RE determining module 810C for determining one or more SIB1 REs carrying the SIB1 of the serving cell and one or more SIB1 REs carrying SIB1 of each of the potential interference neighboring cells. The code in the computer program 810 further includes a valid interference neighboring cell determining module 810D for determining one or more of the potential interference neighboring cells having one or more SIB1 REs colliding with said one or more SIB1 REs of the serving cell, as valid interference neighboring cells. The code in the computer program 810 further includes a cancelling module 810E for cancelling SIB1 of each of the valid interference neighboring cells from the received signal. The code in the computer program 810 further includes a decoding module 810F for decoding the received signal after the cancellation to obtain the SIB1 of the serving cell. The code in the computer program 810 may comprise further modules, illustrated as module 810G, e.g. for controlling and performing other related procedures associated with UE's operations.

The computer program modules could essentially perform the actions of the flow illustrated in FIG. 2, FIG. 5 or FIG. 6, to emulate the arrangement 701 in the UE 700. In other words, when the different computer program modules are executed in the processing unit 806, they may correspond, e.g., to the units 710-760 of FIG. 7.

Although the code means in the embodiments disclosed above in conjunction with FIG. 8 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method used in a User Equipment (UE) for receiving System Information Block Type 1 (SIB1) of a serving cell of the UE, the method comprising:
receiving a signal carrying the SIB1 of the serving cell;
determining one or more neighboring cells of the serving cell as potential interference neighboring cells;
determining one or more SIB1 Resource Elements (REs) carrying the SIB1 of the serving cell and one or more SIB1 REs carrying SIB1 of each of the potential interference neighboring cells;
determining one or more of the potential interference neighboring cells having one or more SIB1 REs colliding with said one or more SIB1 REs of the serving cell, as valid interference neighboring cells;

cancelling SIB1 of each of the valid interference neighboring cells from the received signal; and decoding the received signal after the cancellation to obtain the SIB1 of the serving cell.

2. The method according to claim 1, wherein determining one or more neighboring cells of the serving cell as potential interference neighboring cells comprises:

calculating a quality indicator for each neighboring cell of the one or more neighboring cells of the serving cell; and determining the neighboring cell as a potential interference neighboring cell if the quality indicator is larger than a predetermined threshold.

3. The method according to claim 2, wherein the quality indicator is a signal to interference and noise power ratio.

4. The method according to claim 1, wherein determining one or more SIB1 REs carrying the SIB1 of the serving cell and one or more SIB1 REs carrying SIB1 of each of the potential interference neighboring cells comprises:

decoding Physical Downlink Control Channel (PDCCH) of the serving cell to determine the one or more SIB1 REs of the serving cell; and decoding PDCCH of each of the potential interference neighboring cells to determine one or more SIB1 REs of each of the potential interference neighboring cells.

5. A User Equipment (UE) for receiving System Information Block Type 1 (SIB1) of a serving cell of the UE, the UE comprising:

a receiver configured to receive a signal carrying the SIB1 of the serving cell has been broadcasted; and one or more processors configured to:

determine one or more neighboring cells of the serving cell, as potential interference neighboring cells;

determine one or more SIB1 REs carrying the SIB1 of the serving cell and one or more SIB1 REs carrying SIB1 of each of the potential interference neighboring cells;

determine one or more of the potential interference neighboring cells having one or more SIB1 REs colliding with said one or more SIB1 REs of the serving cell, as valid interference neighboring cells;

cancel SIB1 of each of the valid interference neighboring cells from the received signal; and decode the received signal after the cancellation to obtain the SIB1 of the serving cell.

6. The UE according to claim 5, wherein the one or more processors are configured to:

calculate a quality indicator for each neighboring cell of the one or more neighboring cells of the serving cell; and determine the neighboring cell as a potential interference neighboring cell if the quality indicator is larger than a predetermined threshold.

7. The UE according to claim 6, wherein the quality indicator is a signal to interference and noise power ratio.

8. The UE according to claim 5, wherein the one or more processors are configured to:

decode Physical Downlink Control Channel (PDCCH) of the serving cell to determine the one or more SIB1 REs of the serving cell; and decode PDCCH of each of the potential interference neighboring cells to determine one or more SIB1 REs of each of the potential interference neighboring cells.

9. A non-transitory computer-readable medium storing instructions that when executed, are configured to cause one or more computing devices to:

receive a signal carrying the SIB1 of the serving cell;

determine one or more neighboring cells of the serving cell as potential interference neighboring cells;

determine one or more SIB1 Resource Elements (REs) carrying the SIB1 of the serving cell and one or more SIB1 REs carrying SIB1 of each of the potential interference neighboring cells;

determine one or more of the potential interference neighboring cells having one or more SIB1 REs colliding with said one or more SIB1 REs of the serving cell, as valid interference neighboring cells;

cancel SIB1 of each of the valid interference neighboring cells from the received signal; and decode the received signal after the cancellation to obtain the SIB1 of the serving cell.

* * * * *